US012333161B2

(12) United States Patent
Bhattacharjee et al.

(10) Patent No.: US 12,333,161 B2
(45) Date of Patent: Jun. 17, 2025

(54) REDUCING PROVISIONED STORAGE CAPACITY OF AN AGGREGATE OF A STORAGE APPLIANCE

(71) Applicant: NetApp, Inc., San Jose, CA (US)

(72) Inventors: Mrinal K. Bhattacharjee, Bangalore (IN); Sreenath Korrakuti, Bangalore (IN); Sateesh Kumar Pola, Bangalore (IN)

(73) Assignee: NetApp, Inc., San Jose, CA (US)

( * ) Notice: Subject to any disclaimer, the term of this patent is extended or adjusted under 35 U.S.C. 154(b) by 106 days.

(21) Appl. No.: 18/146,526

(22) Filed: Dec. 27, 2022

(65) Prior Publication Data

US 2024/0220136 A1 Jul. 4, 2024

(51) Int. Cl.
*G06F 3/06* (2006.01)

(52) U.S. Cl.
CPC .......... *G06F 3/0626* (2013.01); *G06F 3/0617* (2013.01); *G06F 3/0644* (2013.01); *G06F 3/0647* (2013.01); *G06F 3/0689* (2013.01)

(58) Field of Classification Search
CPC .... G06F 3/0626; G06F 3/0617; G06F 3/0644; G06F 3/0647; G06F 3/0689
USPC ....................................................... 711/165
See application file for complete search history.

(56) References Cited

U.S. PATENT DOCUMENTS

| | | |
|---|---|---|
| 6,289,356 B1 | 9/2001 | Hitz et al. |
| 7,562,203 B2 | 7/2009 | Scott et al. |
| 7,702,870 B2 | 4/2010 | English et al. |
| 8,200,722 B2 | 6/2012 | Grubbs et al. |
| 8,380,674 B1 | 2/2013 | Bolen et al. |
| 8,898,419 B2 | 11/2014 | Kesavan et al. |
| 9,612,760 B2 | 4/2017 | Kesavan et al. |
| 10,891,057 B1* | 1/2021 | O'Brien, III .......... G06F 3/0688 |
| 2002/0194529 A1 | 12/2002 | Doucette et al. |
| 2010/0205390 A1* | 8/2010 | Arakawa ................. G06F 3/067 711/170 |
| 2012/0079226 A1* | 3/2012 | Kihara .................. G06F 3/0665 711/E12.002 |
| 2014/0089921 A1* | 3/2014 | Yang ................... G06F 9/45558 718/1 |

(Continued)

OTHER PUBLICATIONS

Hewlett Packard., "HP P4000 SAN Solutions—How to Shrink a Volume on SAN/iQ," HPE Support Center, Oct. 24, 2022, 1 page.

(Continued)

*Primary Examiner* — Christopher B Shin
(74) *Attorney, Agent, or Firm* — Jaffery Watson Hamilton & DeSanctis LLP

(57) ABSTRACT

Systems and methods for reducing the provisioned storage capacity of a disk or aggregate of disks of a storage appliance while the storage appliance continues to serve clients are provided. According to one embodiment, the size of the aggregate may be reduced by shrinking the file system of the storage appliance and removing a selected disk from the aggregate. When an identified shrink region includes the entire addressable PVBN space of the selected disk, the file system may be shrunk by relocating valid data from the selected disk elsewhere within the aggregate. After the valid data is relocated, the selected disk may be removed from the aggregate, thereby reducing the provisioned storage capacity of the aggregate by the size of the selected disk.

20 Claims, 10 Drawing Sheets

(56) References Cited

U.S. PATENT DOCUMENTS

| | | | | |
|---|---|---|---|---|
| 2016/0139835 | A1* | 5/2016 | Fiebrich-Kandler | G06F 3/0665 |
| | | | | 711/114 |
| 2018/0165033 | A1* | 6/2018 | Baig | G06F 3/0605 |
| 2023/0315315 | A1* | 10/2023 | Ritika | G06F 3/061 |
| | | | | 711/154 |
| 2023/0315691 | A1* | 10/2023 | Ritika | G06F 3/0608 |
| | | | | 707/693 |
| 2023/0367677 | A1* | 11/2023 | Pawar | G06F 9/4411 |
| 2024/0211158 | A1 | 6/2024 | Bhattacharjee et al. | |

OTHER PUBLICATIONS

NetApp., "Data Mirroring using SyncMirror," Jun. 7, 2022, 2 pages.
NetApp., "What are the Guidelines to be followed while shrinking LUNs," NetApp Knowledge Base, Oct. 24, 2022, 2 pages.
International Search Report and Written Opinion for Application No. PCT/US2023/085905, mailed on Apr. 3, 2024, 13 pages.
Hitz D., et al., "File System Design for an NFS File Server Appliance", XP002421534.
Mell P., et al., "The NIST Definition of Cloud Computing", National Institute of Standards and Technology, 2011, 7 pages.
Written Opinion for International Application No. PCT/US2023/085905, mailed on Apr. 3, 2024, 18 pages.

\* cited by examiner

REDUCING PROVISIONED STORAGE CAPACITY OF AN AGGREGATE OF A STORAGE APPLIANCE

BACKGROUND

Field

Various embodiments of the present disclosure generally relate to data storage appliances. In particular, some embodiments relate to an approach for reducing the provisioned physical storage capacity of a file system hosting disk or aggregate of disks, for example, by means of relocating data from a source disk to a destination disk and removing the source disk from the aggregate.

Description of the Related Art

Assuming a Pay-As-You-Go model for provisioned storage capacity of a file system hosting disk or aggregate of disks associated with a virtual or physical storage appliance, it is generally desirable to avoid wasting storage space. In order to avoid wasting aggregate space some appliances implement storage thin provisioning by creating an aggregate of a minimum initial required size. Thereafter, the aggregate space usage may be monitored to grow the aggregate (increase the provisioned storage capacity available for use by the storage appliance) as needed. For example, the provisioned physical storage capacity of a file system hosting disk or aggregate of disks may be dynamically increased by having a hyperscaler or other environment in which the storage appliance at issue is hosted, grow one or more of the underlying hyperscaler disks and/or add disks when the supported capacity of the underlying disks is reached. An example of increasing provisioned storage capacity for a virtual storage appliance implemented within a hyperscaler is described in co-pending U.S. patent application Ser. No. 17/468,892 (the "Disk Grow Patent Application"), which is hereby incorporated by reference in its entirety for all purposes.

SUMMARY

Systems and methods are described for reducing the provisioned storage capacity of a disk or aggregate of disks of a storage appliance while the storage appliance continues to serve clients. According to one embodiment, a shrink region within a range of block numbers of an aggregate of a storage appliance is identified by selecting a source disk of multiple disks within the aggregate. Valid data within the shrink region is relocated from the source disk to a destination disk within the aggregate. A provisioned storage capacity of the aggregate is reduced. One or more data structures utilized by a file system of the storage appliance are then updated to reflect the reduced provisioned storage capacity of the aggregate.

Other features of embodiments of the present disclosure will be apparent from accompanying drawings and detailed description that follows.

BRIEF DESCRIPTION OF THE DRAWINGS

In the Figures, similar components and/or features may have the same reference label. Further, various components of the same type may be distinguished by following the reference label with a second label that distinguishes among the similar components. If only the first reference label is used in the specification, the description is applicable to any one of the similar components having the same first reference label irrespective of the second reference label.

DETAILED DESCRIPTION

Figure 1:
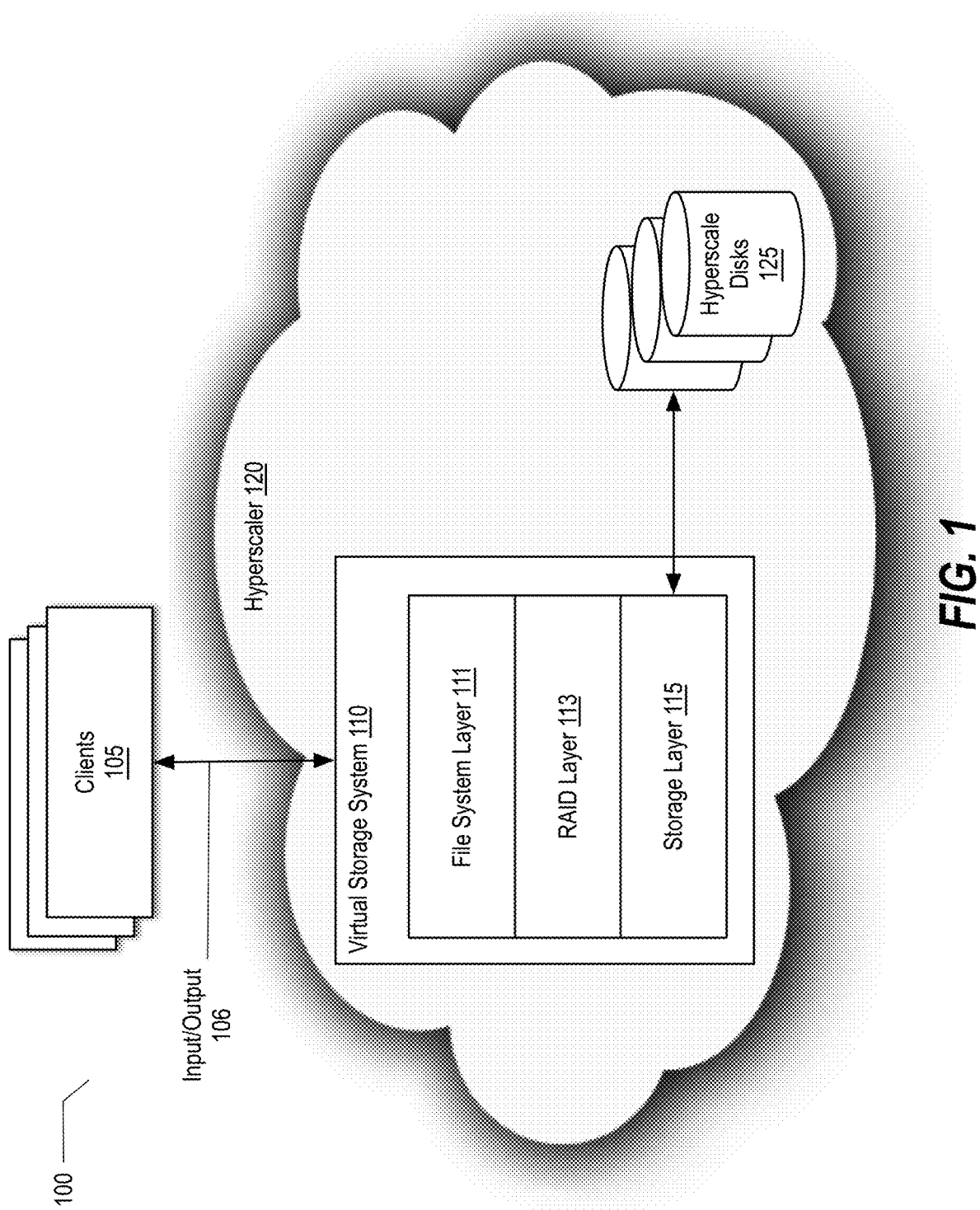
FIG. 1 is a high-level block diagram conceptually illustrating a virtual storage system with hyperscale disks in accordance with an embodiment of the present disclosure.

Systems and methods are described for reducing the provisioned storage capacity of a disk or aggregate of disks of a storage appliance while the storage appliance continues to serve clients. Some storage appliances implement mechanisms to facilitate dynamically increasing the provisioned storage capacity of a disk or aggregate of disks hosting a file system; however, at present, the reverse direction (i.e., reducing the provisioned storage capacity of a disk or aggregate of disks hosting a file system) is not supported.

Shrinking or reducing the size of an aggregate may be achieved by shrinking the size of one or more disks that belong to the aggregate or by removing a disk from the aggregate. None of the major cloud providers currently support shrinking the size of an existing disk. Therefore, various embodiments described herein focus on approaches for removal of a disk from an aggregate to reduce the aggregate size. Additionally, as described further below, if and when one or more cloud providers do ultimately provide support for shrinking the size of an existing disk, for example, via a method exposed by their respective cloud provider application programming interfaces (APIs), embodiments described herein may take advantage of such support.

According to one embodiment, the size of an aggregate may be reduced by removing an identified "shrink region" (e.g., a physical volume block number (PVBN) range, encompassing an entire disk or a region of a disk) from the aggregate. That is, the aggregate's, addressable (writable) PVBN space may be shrunk. As will be appreciated by those skilled in the art, in order to avoid data loss, before shrinking an aggregate, the file system should be shrunk, for example, by relocating (e.g., moving or copying) valid data within the shrink region. According to one embodiment, the valid data within the shrink region may be relocated elsewhere within the aggregate, for example, to one or more existing disks within the aggregate.

As described further below, in one embodiment, reducing the provisioned storage capacity of an aggregate of a storage appliance involves performing the following:

Shrinking the file system, for example, by
  Identifying the shrink region, which might map to a part of a disk, parts of multiple disks, or a complete disk, for example, by selecting the disk within the aggregate having the lowest storage utilization;
  Precluding data from subsequently being written to the shrink region, for example, by teaching a block allocator module associated with the file system not to allocate block from the shrink region;
  Relocating valid data from blocks within the shrink region; and
  Teaching the various layers (e.g., file system layer, RAID layer, and storage layer) to remove the shrink region from the aggregate's PVBN space; and
Shrinking physical provisioned storage capacity of the aggregate, for example, by removing a disk from the aggregate or shrinking a disk of the aggregate or shrinking multiple disks of the aggregate (if and when shrinking disks is supported by the hyperscaler or other environment that hosts the storage appliance).

As will be appreciated, there are a number of options for identifying the shrink region, including its size and starting point. For example, the size of the shrink region may be identified based on various thresholds (e.g., aggregate storage utilization thresholds for triggering increasing and/or reducing provisioned physical storage capacity and/or desired provisioned storage capacity growth and/or shrinkage thresholds). Depending upon the implementation of disk grow functionality that may also be supported by the storage appliance, the start of the shrink region should be consistent with the manner in which disks are grown. For example, both aggregate grow and aggregate shrink may start from the end of any given disk (the source disk) in the aggregate.

When the shrink region encompasses the entire space related to the source disk, valid data may be relocated from the source disk to another disk (the destination disk) within the aggregate, for example, by repurposing existing file system block reallocator functionality previously used for performing defragmentation. Below, this approach may be referred to as the "first approach for file system shrink." After the valid data has been relocated, the source disk may be removed from the aggregate. Below, this approach may be referred to as the "first approach for aggregate shrink." When the shrink region is less than the entirety of the source disk, one option is to relocate valid data from the shrink region of the source disk to one or more regions outside of the shrink region within the aggregate as above via file system block reallocator functionality followed by leveraging existing data mirroring technology (e.g., RAID SyncMirror available from NetApp, Inc. of San Jose, CA) to move valid data from outside of the shrink region of the source disk to a new, smaller disk (the destination disk) added to the aggregate. Below, this approach may be referred to as the "second approach for file system shrink." Then, after mirroring is complete, the source disk may be removed from the aggregate. Below, this approach may be referred to as the "second approach for aggregate shrink."

While in the context of various examples described herein, shrinking of an aggregate is performed at the end of a disk in the aggregate, in one embodiment, the use of a sparse volume block number space (VBN) space for an aggregate and the notion of disks having both a "physical size" and a "logical size" allows the flexibility to remove physical storage space from anywhere within a disk.

While some embodiments of the present disclosure are described herein with reference to particular usage scenarios in the context of a virtual storage system with hyperscale disks, it is to be understood that the methodologies and algorithms are equally applicable to any storage system (virtual or physical) with any type of disks (e.g., Logical Unit Numbers (LUNs)) that can be shrunk or removed.

In the following description, numerous specific details are set forth in order to provide a thorough understanding of embodiments of the present disclosure. It will be apparent, however, to one skilled in the art that embodiments of the present disclosure may be practiced without some of these specific details. In other instances, well-known structures and devices are shown in block diagram form.

Terminology

Brief definitions of terms used throughout this application are given below.

A "computer" or "computer system" may be one or more physical computers, virtual computers, or computing devices. As an example, a computer may be one or more server computers, cloud-based computers, cloud-based cluster of computers, virtual machine instances or virtual machine computing elements such as virtual processors, storage and memory, data centers, storage devices, desktop computers, laptop computers, mobile devices, or any other special-purpose computing devices. Any reference to "a computer" or "a computer system" herein may mean one or more computers, unless expressly stated otherwise.

The terms "connected" or "coupled" and related terms are used in an operational sense and are not necessarily limited to a direct connection or coupling. Thus, for example, two devices may be coupled directly, or via one or more intermediary media or devices. As another example, devices may be coupled in such a way that information can be passed there between, while not sharing any physical connection with one another. Based on the disclosure provided herein, one of ordinary skill in the art will appreciate a variety of ways in which connection or coupling exists in accordance with the aforementioned definition.

If the specification states a component or feature "may", "can", "could", or "might" be included or have a characteristic, that particular component or feature is not required to be included or have the characteristic.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The phrases "in an embodiment," "according to one embodiment," and the like generally mean the particular feature, structure, or characteristic following the phrase is included in at least one embodiment of the present disclosure, and may be included in more than one embodiment of the present disclosure. Importantly, such phrases do not necessarily refer to the same embodiment.

As used herein a "cloud" or "cloud environment" broadly and generally refers to a platform through which cloud computing may be delivered via a public network (e.g., the Internet) and/or a private network. The National Institute of Standards and Technology (NIST) defines cloud computing as "a model for enabling ubiquitous, convenient, on-demand network access to a shared pool of configurable computing resources (e.g., networks, servers, storage, applications, and services) that can be rapidly provisioned and released with minimal management effort or service provider interaction." P. Mell, T. Grance, The NIST Definition of Cloud Computing, National Institute of Standards and Technology, USA, 2011. The infrastructure of a cloud may be deployed in accordance with various deployment models, including private cloud, community cloud, public cloud, and hybrid cloud. In the private cloud deployment model, the cloud infrastructure is provisioned for exclusive use by a single organization comprising multiple consumers (e.g., business units), may be owned, managed, and operated by the organization, a third party, or some combination of them, and may exist on or off premises. In the community cloud deployment model, the cloud infrastructure is provisioned for exclusive use by a specific community of consumers from organizations that have shared concerns (e.g., mission, security requirements, policy, and compliance considerations), may be owned, managed, and operated by one or more of the organizations in the community, a third party, or some combination of them, and may exist on or off premises. In the public cloud deployment model, the cloud infrastructure is provisioned for open use by the general public, may be owned, managed, and operated by a cloud provider or hyperscaler (e.g., a business, academic, or government organization, or some combination of them), and exists on the premises of the cloud provider. The cloud service provider may offer a cloud-based platform, infrastructure, application, or storage services as-a-service, in accordance with a number of service models, including Software-as-a-Service (SaaS), Platform-as-a-Service (PaaS), and/or Infrastructure-as-a-Service (IaaS). In the hybrid cloud deployment model, the cloud infrastructure is a composition of two or more distinct cloud infrastructures (private, community, or public) that remain unique entities, but are bound together by standardized or proprietary technology that enables data and application portability and mobility (e.g., cloud bursting for load balancing between clouds).

As used herein, a "storage appliance" generally refers to a type of computing appliance, in virtual or physical form, that provides data to, or manages data for, other computing devices or clients (e.g., applications).

As used herein, a "storage aggregate" or simply an "aggregate" generally refers to a collection of disks (or partitions) that may be arranged into one or more redundant array of independent disk (RAID) groups. An aggregate may be composed of drives or array LUNs.

As used herein, a "hyperscale disk" generally refers to a storage volume or cloud volume supplied by a hyperscaler or cloud provider. Non-limiting examples of hyperscale disks include Amazon Web Services (AWS) Elastic Block Store (EBS), Google Cloud Platform (GCP) persistent disks (PDs), and Microsoft Azure managed disks (MDs). Such cloud volumes may represent persistent storage that is accessible to a virtual storage system by virtue of the persistent storage being associated with a compute instance in which the virtual storage system is running. A cloud volume may represent a hard-disk drive (HDD) or a solid-state drive (SSD) from a pool of storage devices within a cloud environment that is connected to the compute instance through Ethernet or fibre channel (FC) switches as is the case for network-attached storage (NAS) or a storage area network (SAN). Non-limiting examples of cloud volumes include various types of SSD volumes (e.g., AWS EBS gp2, gp3, io1, and io2 volumes for EC2 instances) and various types of HDD volumes (e.g., AWS EBS st1 and sc1 volumes for EC2 instances).

Example Operating Environment

FIG. 1 is a block diagram illustrating an environment 100 in which various embodiments may be implemented. In various examples described herein, a storage appliance (e.g., virtual storage system 110) may be run (e.g., on a VM or as a containerized instance, as the case may be) within a public cloud provider (e.g., hyperscaler 120). In the context of the present example, the virtual storage system 110 makes use of cloud volumes/disks (e.g., hyperscale disks 125) provided by the hyperscaler 120. Hyperscaler 120 may provide various types of cloud volumes/disks having different performance characteristics, sizes, and pricing. Non-limiting examples of cloud volumes/disks include AWS EBS, GCP PDs, and Microsoft Azure MDs.

The virtual storage system 110 may present storage over a network to clients 105 using various protocols (e.g., small computer system interface (SCSI), Internet small computer system interface (ISCSI), fibre channel (FC), common Internet file system (CIFS), network file system (NFS), hypertext transfer protocol (HTTP), web-based distributed authoring and versioning (WebDAV), or a custom protocol. Clients 105 may request services of the virtual storage system 110 by issuing Input/Output requests 106 (e.g., file system protocol messages (in the form of packets) over the network). A representative client of clients 105 may comprise an application, such as a database application, executing on a computer that "connects" to the virtual storage system 110 over a computer network, such as a point-to-point link, a shared local area network (LAN), a wide area network (WAN), or a virtual private network (VPN) implemented over a public network, such as the Internet.

In the context of the present example, the virtual storage system 110 is shown including a number of layers, including a file system layer 111, a RAID layer 113, and a storage layer 115. These layers may represent components of data management software (e.g., ONTAP data management software from NetApp, Inc. of San Jose, CA) (not shown) of the virtual storage system 110. The file system layer 111 generally defines the basic interfaces and data structures in support of file system operations (e.g., initialization, mounting, unmounting, creating files, creating directories, opening files, writing to files, and reading from files). The RAID layer 113 encapsulates data storage virtualization technology for combining multiple disks into RAID groups, for example, for purposes of data redundancy, performance improvement, or both. The storage layer 115 may include storage drivers for interacting with the various types of hyperscale disks supported by the hyperscaler 120.

Example Sparse Space

Figure 2:
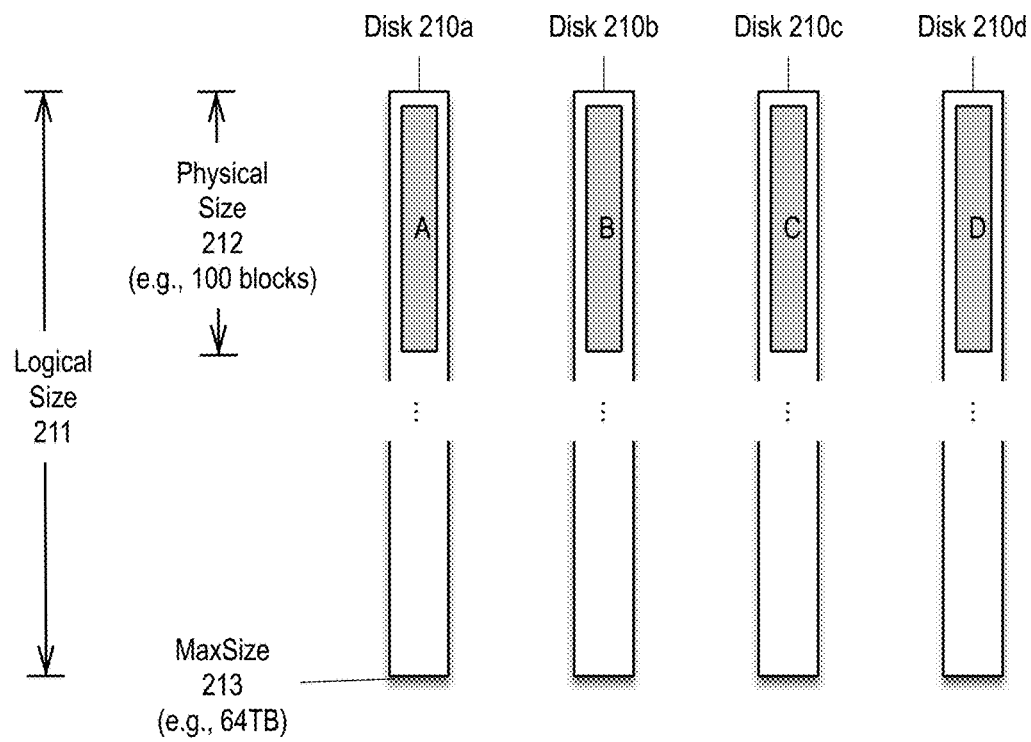
FIG. 2 is a block diagram conceptually illustrating the relationship between the physical and logical sizes of disks and corresponding volume block numbers (VBNs) within a sparse block number space of a file system aggregate in accordance with an embodiment of the present disclosure.
Figure 2:
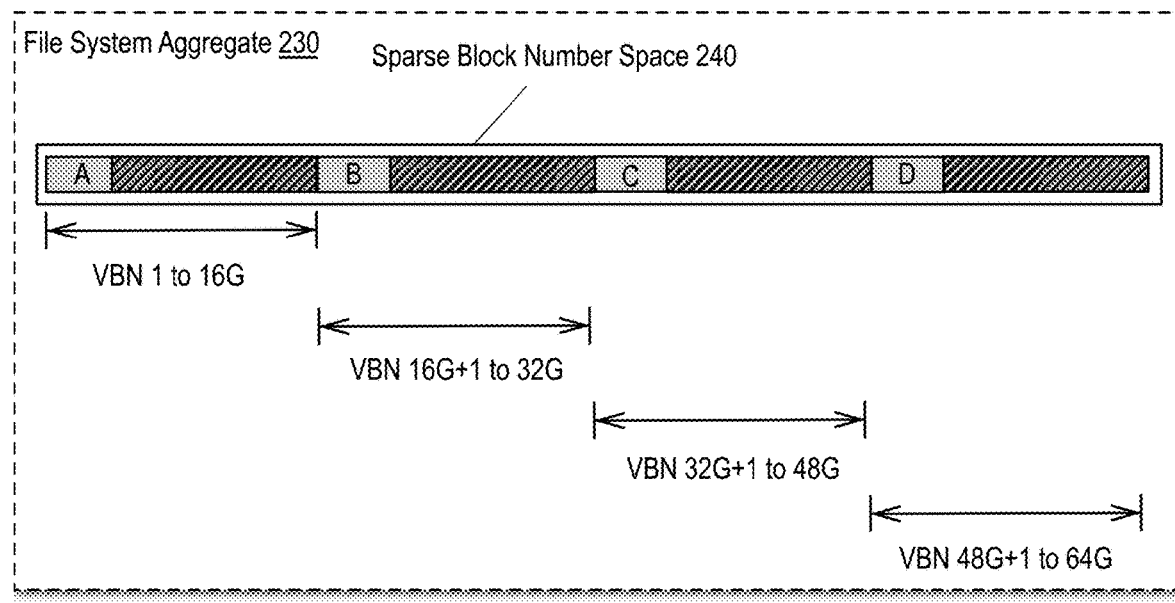

FIG. 2 is a block diagram conceptually illustrating the relationship between the physical and logical sizes of disks 210a-d and corresponding volume block numbers (VBNs) within a sparse block number space 240 of an aggregate (e.g., file system aggregate 230) of a file system (e.g., a Copy-on-Write file system, such as the proprietary Write Anywhere File Layout (WAFL) file system (available from NetApp, Inc. of San Jose, CA)) in accordance with an embodiment of the present disclosure. The file system (e.g., file system layer 111), may represent a component or layer of data management software (e.g., ONTAP data management software) running on a storage appliance (e.g., virtual storage system 110). Depending upon the virtual or physical nature of the storage appliance, the disks 210a-d may represent hyperscale disks (e.g., hyperscale disks 125) or disks associated with a disk or storage array (e.g., a fabric attached storage (FAS) storage array), respectively.

As used herein, the "logical size" (e.g., logical size 211) of a given disk refers to a maximum storage capacity (e.g., MaxSize 213) supported by the particular type of disk, whereas the "physical size" (e.g., physical size 212) of a given disk refers to the storage capacity of the disk that is currently provisioned for use as backing storage by the file system and the configured size of the corresponding representation or abstraction of the disk (which may be referred to herein as a file system disk) within the file system.

As input/output operations per second (IOPS) improvements resulting from increasing the provisioned storage capacity of some hyperscale disks may be capped, in some embodiments, the logical size of a hyperscale disk may refer to the provisioned storage capacity of the particular hyperscale disk beyond which no further improvements are realized for the particular hyperscale disk.

In order to accommodate the Pay-As-You-Go model, in various examples, a relatively small amount of storage capacity (e.g., on the order of tens or hundreds of gigabytes (GBs)) may be provisioned at a time for use by the storage appliance.

For purposes of providing a concrete example of how VBNs may be pre-allocated within a contiguous sequence of block numbers (e.g., the sparse space 240) maintained by the file system to track file system disks corresponding to disks 210a-d, certain non-limiting assumptions are made in connection with the discussion of FIG. 2. For example, in the context of the present example, it is assumed the file system aggregate 230 includes four disks (numbered 0 to 3, respectively), the logical size 211 of each underlying disk (e.g., each hyperscale disk) is 64 terabytes (TB), an initial physical size provisioned from each hyperscaler disk is 100 blocks, and the block size is 4 kilobytes (KB). The optimal number and type of disks to be used for any particular storage appliance may depend upon a number of factors, including, among other things, the workloads to be supported, failover time requirements, IOPS needs, etc.

In general and without taking into consideration space that may be used for file system metadata that may be stored at the beginning of a particular file system disk (e.g., the first file system disk), the start VBN for each file system disk of a volume (e.g., file system aggregate 230) of the storage appliance may be pre-allocated within the sparse block number space 240 based on the following:

$$\text{Start VBN} = (N * \text{MaxSize}/\text{BlockSize}) + 1 \qquad \text{EQ \#1}$$

where,

N is the file system disk number;

MaxSize is the maximum storage capacity (logical size) of the underlying disk; and BlockSize is the size of a block of storage.

In embodiments in which file system metadata is stored at the beginning of the first hyperscale disk, the start VBN for the first system disk may be treated as a special case as it may have fewer usable VBNs than other file system disks. For example, the number of VBNs used by the file system metadata may be added to the VBN returned by EQ #1 to arrive at the start VBN for the first file system disk.

In the context of the present example, VBNs 1 to 16 billion (G) are pre-allocated for a first file system disk to accommodate the logical size of disk 210a, including the currently provisioned portion (A) of disk 210a; VBNs 16 G+1 to 32 G are pre-allocated for a second file system disk to accommodate the logical size of disk 210b, including the currently provisioned portion (B) of disk 210b; VBNs 32 G+1 to 48 G are pre-allocated for a third file system disk to accommodate the logical size of disk 210c, including the currently provisioned portion (C) of disk 210c; and VBNs 48 G+1 to 64 G are pre-allocated for a fourth file system disk to accommodate the logical size of disk 210d, including the currently provisioned portion (D) of disk 210d.

In this manner, each file system disk has room to grow within the contiguous sequence of block numbers maintained by the file system aggregate 230 as additional storage capacity of the corresponding underlying hyperscale disk is provisioned for use by the storage appliance.

Example Aggregate/Disk Growth

Figures 3A, 3B, 3C:
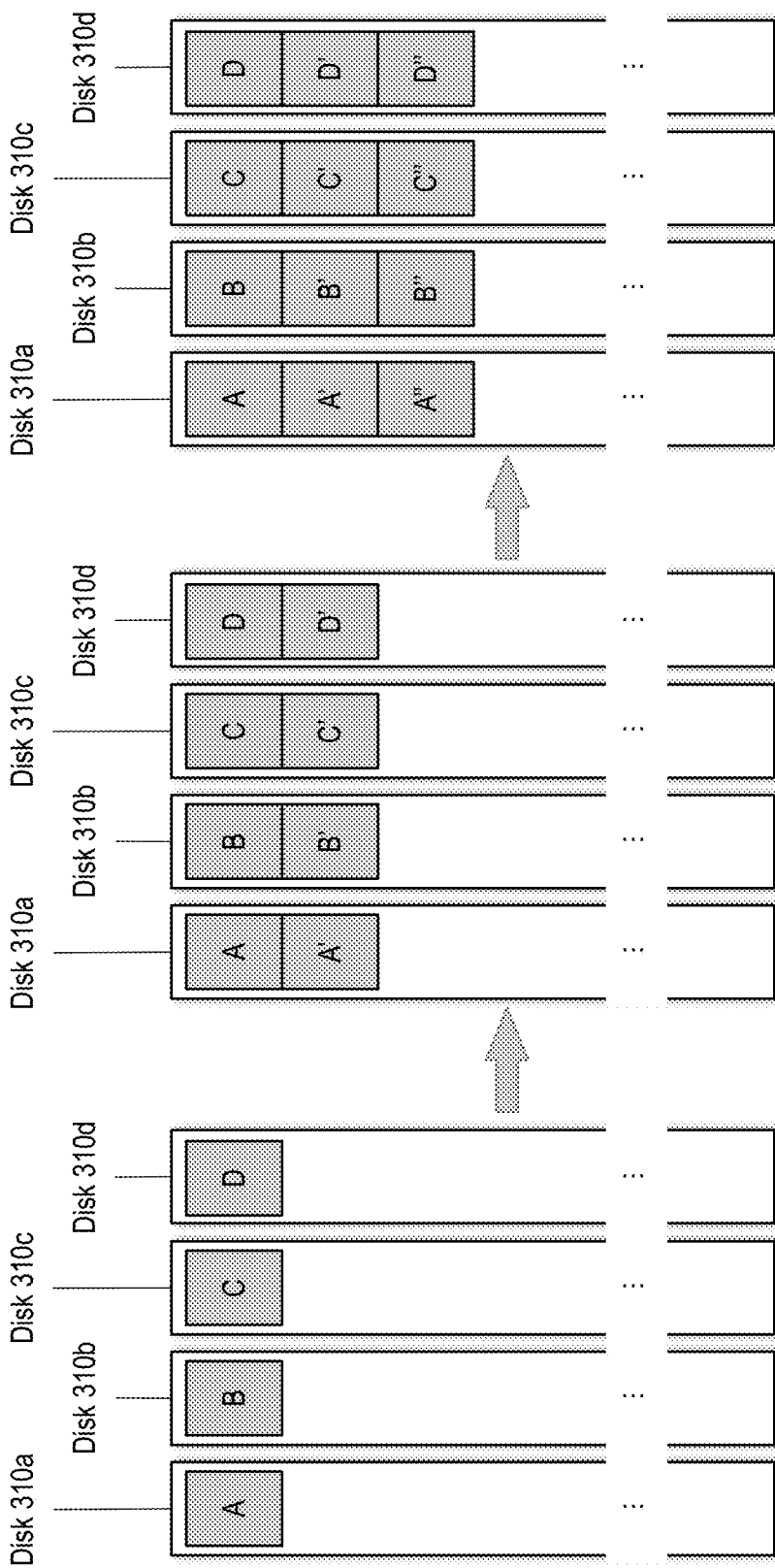
FIGS. 3A-C are block diagrams conceptually illustrating the growth of a set of disks in accordance with an embodiment of the present disclosure.

FIGS. 3A-C are block diagrams conceptually illustrating the growth of a set of disks (e.g., disks 310a-d) in accordance with an embodiment of the present disclosure. In FIG. 3A, predetermined amount of storage capacity (e.g., a predetermined number of blocks represented by A, B, C, and D) may be provisioned from each disk (e.g., each of hyperscale disks 125) for use by a storage appliance (e.g., virtual storage system 110). Assuming the initial provisioned storage capacity for each disk is X and the maximum supported storage capacity of each of the disks is N, at this point, the physical size of an aggregate (e.g., file system aggregate 230) including disks 310a-d is 4X and the logical size is 4N.

Assuming disk grow functionality is implemented by the storage appliance, as shown in FIG. 3B, responsive to a predetermined threshold of the provisioned portion of the storage being used, an additional predetermined amount of storage capacity (e.g., represented by A', B', C', and D') may be provisioned from each disk 310a-d and made available for use by the aggregate. At this point, the physical size of the aggregate is now 8X and the logical size remains 4N.

As shown in FIG. 3C, this process of increasing the provisioned portions of disks 310a-d by an additional predetermined amount of storage capacity (e.g., represented by A", B", C", and D") may be repeated until the maximum size of the disks are reached. At the point in time represented by FIG. 3C, the physical size of the aggregate is 12X and the logical size remains 4N. When the maximum size of each of the disks has been provisioned, both the physical size of the aggregate and the logical size will be 4N. At that point, should additional storage capacity be required, one or more additional disks may be added.

Examples of Reducing the Provisioned Storage Capacity of a Disk or an Aggregate

Figure 4A:
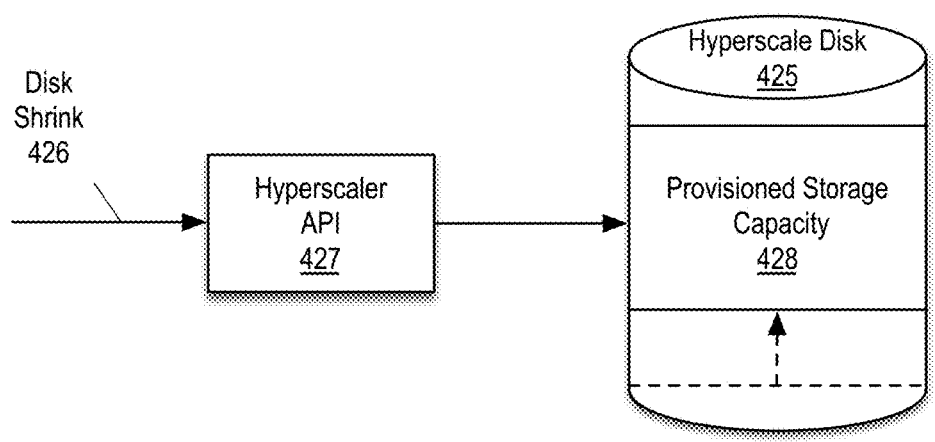
FIG. 4A is a block diagram conceptually illustrating one approach for reducing the provisioned storage capacity of a disk in accordance with an embodiment of the present disclosure.

FIG. 4A is a block diagram conceptually illustrating one approach for reducing the provisioned storage capacity of a disk (e.g., hyperscale disk 325, which may be analogous to one of hyperscale disks 125) in accordance with an embodiment of the present disclosure. As noted above, none of the major cloud providers currently support shrinking the size of an existing disk (e.g., hyperscale disk 325); however, if and when such functionality is supported, presumably, the storage-appliance hosting environment at issue (e.g., hyperscaler 120) will expose a disk shrink method/command 326 via by an API (e.g., hyperscaler API 327) responsive to which the provisioned storage capacity 328 of the disk will be reduced. The disk shrink method/command 326 may include one or more arguments, for example, one specifying the amount by which the disk is to be shrunk and another specifying whether the disk is to be shrunk from the beginning or end. To the extent such a disk shrink method/command is supported by the hosting environment, the storage appliance may handle shrinking of the file system (e.g., relocation of file system data and metadata from a portion of the disk (the source disk) to which the shrink region maps to another disk (the destination disk) within the aggregate) and may then invoke the disk shrink method/command 326 to shrink the source disk to exclude the now unused portion, thereby providing cost savings. A non-limiting example of a set of operations for performing file system shrink is described below with reference to FIG. 7.

When such a disk shrink method/command is not supported by the hosting environment, the storage appliance may handle both performance of the file system shrink (e.g., preservation of file system data by relocating valid data within the shrink region) and performance of the aggregate shrink by, for example, by removing a disk from the aggregate in one of the ways illustrated by FIGS. 4B-C or FIGS. 4D-F as appropriate for the circumstances.

Figure 4B:
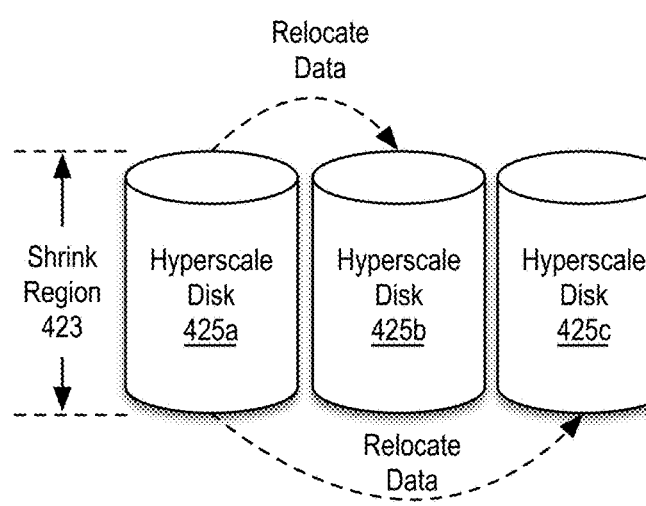
FIGS. 4B-C are block diagrams conceptually illustrating an approach for reducing the provisioned storage capacity of an aggregate when a specified shrink region represents the entirety of the source disk in accordance with an embodiment of the present disclosure.
Figure 4C:
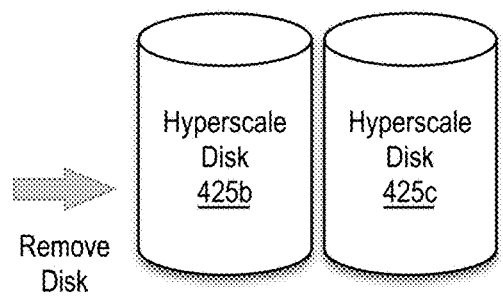

FIGS. 4B-C are block diagrams conceptually illustrating an approach for reducing the provisioned storage capacity of an aggregate (e.g., file system aggregate 230) when a specified shrink region (e.g., shrink region 423) represents the entirety of the source disk (e.g., hyperscale disk 425a) in accordance with an embodiment of the present disclosure. In the context of the present example, the aggregate to be shrunk includes three hyperscale disks 425a-c in which one or both of hyperscale disks 425b-c represent a destination disk. According to one embodiment, the size of the aggregate may be reduced by removing the specified shrink region (e.g., a PVBN range, encompassing an entire disk or a portion of a disk currently provisioned for use by the storage appliance) from the aggregate. Various approaches for identifying the size and starting point of the shrink region 423 are described below. As noted above, when the shrink region 423 encompasses the entirety of the source disk, valid data may be relocated from the source disk to one or more other disks (the destination disks) within the aggregate and then the source disk may be removed from the aggregate. In the context of the present example, the provisioned storage capacity of the aggregate is reduced by the storage capacity of hyperscale disk 425a. Non-limiting examples of a set of operations for performing file system shrink and aggregate shrink consistent with the present example are described below with reference to FIGS. 7 and 8, respectively.

Figure 4D:
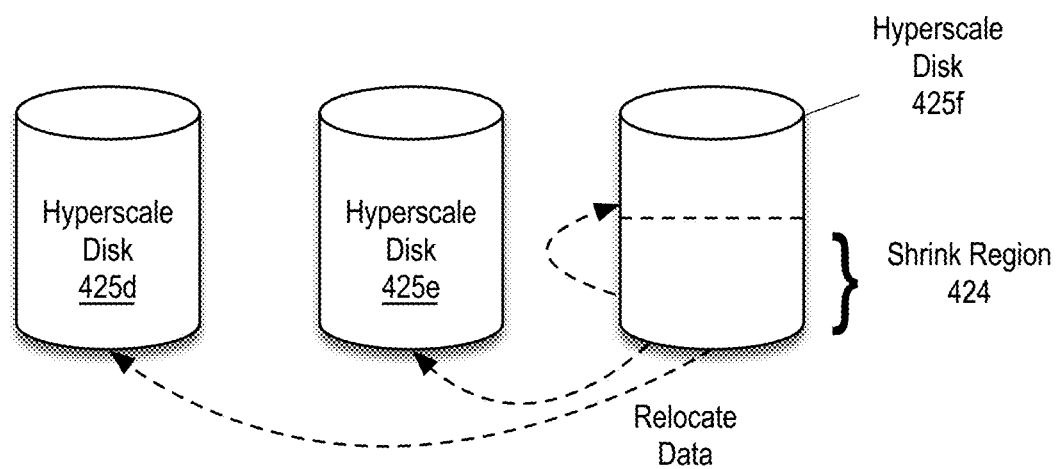
FIGS. 4D-F are block diagrams conceptually illustrating an approach for reducing the provisioned storage capacity of an aggregate when a specified shrink region represents less than the entirety of the source disk in accordance with an embodiment of the present disclosure.
Figure 4E:
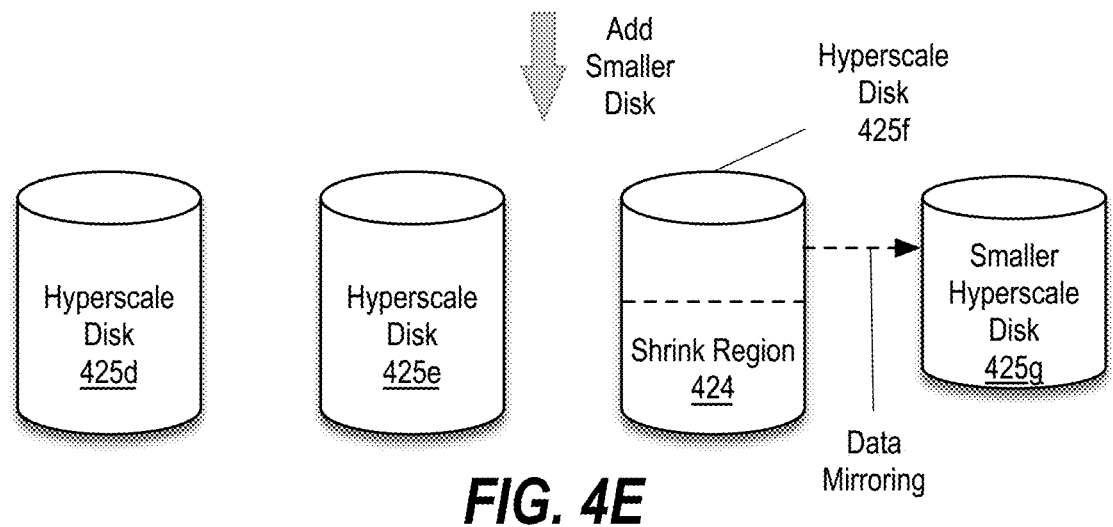
Figure 4F:
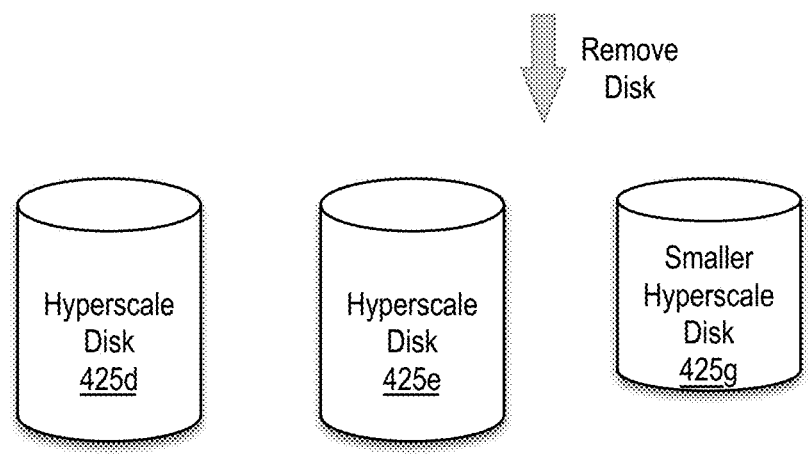

FIGS. 4D-F are block diagrams conceptually illustrating an approach for reducing the provisioned storage capacity of an aggregate (e.g., file system aggregate 230) when a specified shrink region (e.g., shrink region 424) represents less than the entirety of the source disk (e.g., hyperscale disk 425f) in accordance with an embodiment of the present disclosure. In the context of the present example, the aggregate to be shrunk includes three hyperscale disks 425d-f. As in the case of FIGS. 4B-C, the size of the aggregate may be reduced by removing the shrink region 424 from the aggregate.

When the shrink region 424 does not encompass the entirety of the source disk, but reduces the utilized portion of the source disk sufficiently to be accommodated by a smaller sized disk (e.g., smaller hyperscale disk 425g), having less storage capacity than the source disk, data may be first relocated from the shrink region 424 to one or more regions outside of the shrink region 424 as shown by FIG. 4D. Then, the smaller hyperscale disk 425g may be added to the aggregate as shown by FIG. 4E and valid data outside of the shrink region 424 of the source disk may be moved to the smaller hyperscale disk 425g by performing data mirroring from the source disk to the smaller hyperscale disk 425f. Finally, after the mirroring is complete (i.e., the smaller hyperscale disk 425f has all the valid data that the source disk has), the source disk may be removed from the aggregate as shown by FIG. 4F.

In this manner, the provisioned storage capacity of the aggregate is reduced by the storage capacity difference between hyperscale disk 425f and smaller hyperscale disk 425g. Non-limiting examples of a set of operations for performing file system shrink and aggregate shrink consistent with the present example are described below with reference to FIGS. 9 and 10, respectively.

Example File System Components

Figure 5:
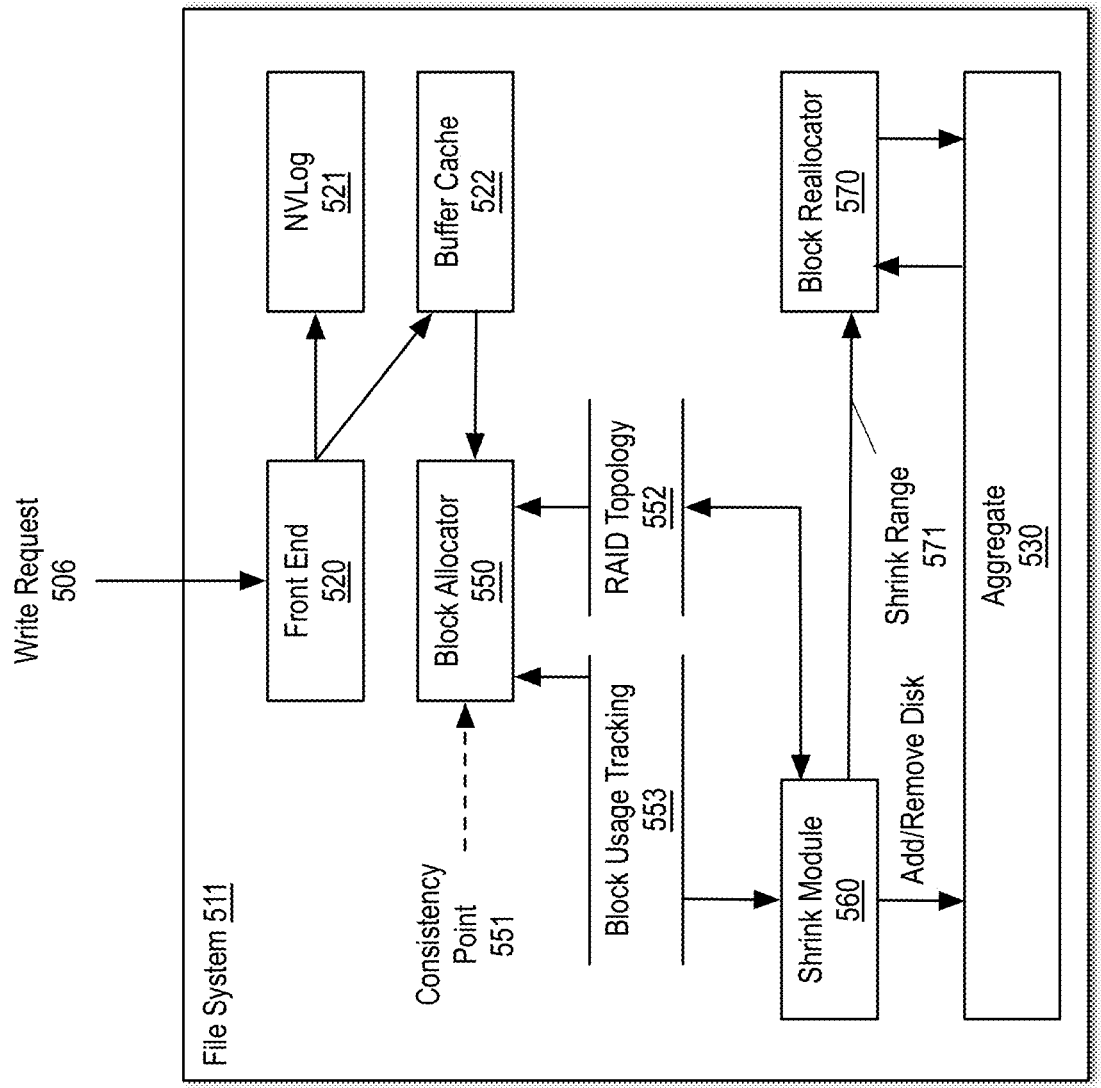
FIG. 5 is a block diagram illustrating an example of file system components that may be involved in shrinking an aggregate in accordance with an embodiment of the present disclosure.

FIG. 5 is a block diagram illustrating an example of file system components that may be involved in shrinking an aggregate 530 in accordance with an embodiment of the present disclosure. In the context of the present example, a file system 511 (which may be analogous to file system layer 111 is shown including a front end 520, a non-volatile log (NVlog) 521 (e.g., in NV random access memory (NVRAM)), a buffer cache 522 (e.g., in RAM), a block allocator 550, a block usage tracking data store 553, a RAID topology data store 552, a shrink module, a block reallocator 570, and the aggregate 530 (which may be analogous to file system aggregate 230).

The file system 511 may be a write-anywhere file system that does not overwrite data on disks. Instead, a data block is retrieved from a disk into a memory and is updated or modified (i.e., dirtied) with new data, the data block is thereafter written to a new location on the disk. When accessing a block of a file in response to a request, the files system specifies a VBN that is translated to a disk block number (DBN) location on a particular disk within a RAID group. Since each block in the VBN space and in the DBN space is typically fixed (e.g., 4K bytes) in size, there is typically a one-to-one mapping between the information stored on disks in the DBN space and the information organized by the file system in the VBN space.

The block usage tracking data store 553 may include information regarding blocks within a VBN space that are used and unused. For example, for each VBN of the aggregate 530, the block usage tracking data store 553 may include a flag indicative of whether the corresponding DBN contains valid data.

The RAID topology data store 552 may include a data structure for each file system disk and corresponding backing disk (e.g., disk 210a-d) including information indicative of, among other things, a base VBN, a range of DBNs (e.g., the minimum usable DBN and the maximum usable DBN, and a new maximum DBN that is to be effective after the corresponding disk has been shrunk. A non-limiting example of such a data structure is as follows:

```
typedef struct raidtop_range {
    vbn_t rtr_basevbn; /* lowest VBN in this disk range */
    fs_dbn_t rtr_mindbn; /* Min useful DBN in disk range */
    fs_dbn_t rtr_maxdbn; /* 1 + last DBN on disk range */
    raidtop_range_id rtr_disknext; /* next range for this disk */
    raidtop_range_id rtr_groupnext; /* next range for the raidgroup */
    raidtop_range_id rtr_volnext; /* next range in volume VBN space */
    raidtop_disk_id rtr_parent; /* owning disk for this range */
    vbn_t rtr_hst_offset; /* lowest VBN relative to the SSD tier */
    fs_dbn_t rtr_new_maxdbn; /* new maxdbn after the shrink */
} raidtop_range_t;
```

The front end 520 may be responsible for, among other things, receiving write requests (e.g., write request 506), persisting information (e.g., the VBN and the data to be written to the VBN) regarding a given write request in the NVlog 521 and the buffer cache 522, and marking updated buffers in the buffer cache 522 as dirty to facilitate periodic flushing to disk. Such an approach allows the front end 520 to promptly send an acknowledgement to the client (e.g., one of clients 106) that originated the write request 506 without waiting for the data to be persisted to a disk within the aggregate 530. The delayed sending of dirty data to the disk also provides other benefits, such as amortized overhead of allocation and improved on-disk layout by grouping related data blocks together. In a write-anywhere file system, the point in time when a collection of changes to the data blocks is sent to the disk is known as a consistency point (e.g., consistency point 551). A consistency point (CP) may conceptually be considered a point-in-time image of the updates to the file system since the previous CP. The process of emptying the buffer cache 522 by sending the dirty data to the disk may be accomplished by collecting a list of index nodes (inodes) that have been modified since the last CP and then cleaning the inodes, for example, by having the block allocator 550 assign new locations on disk for the dirty buffers and then flushing the buffers to those locations on disk.

The block allocator 550 may be responsible for assigning the new locations on disk for the dirty buffers based on information stored in the block usage tracking data store 553 and the RAID topology data store 552.

The shrink module 560 may be responsible for monitoring storage utilization of the aggregate 530 and adding/removing disks to the aggregate 530 for purposes of reducing the provisioned storage capacity of the aggregate 530. The shrink module 560 may make use of the block reallocator 570 to perform relocation of valid data within the shrink region (e.g., shrink range 571), which may be analogous to shrink region 423 or 424, from one disk to another (e.g., an existing disk within the aggregate 530). In one embodiment, writes may continue to be processed concurrently with the relocation of data from the shrink region. In order to preclude the block allocator 550 from writing to a block that is within the shrink region, before directing the block reallocator 570 to begin relocation of data, the shrink module 560 may set the new maximum DBN field within data structure of the file system disk. For its part, during a consistency point, the block allocator 550 may consult the new maximum DBN field and limit DBN allocation based on the new maximum DBN field; otherwise any unused DBN in the range of DBNs may be allocated. In this manner, the reduction in provisioned storage capacity may be performed while the storage appliance is online and serving its clients (i.e., without taking any downtime).

The block reallocator 570 may be responsible for relocating valid data within a specified shrink region (e.g., shrink range 571) elsewhere within the aggregate 530. Given the similarity in operation to defragmentation functionality, as will be appreciated by those skilled in the art and as noted above, the block reallocator 570 may implemented, for example, by repurposing existing defragmentation functionality.

The various layers and components/modules described herein, and the processing described below with reference to the flow diagrams of FIGS. 7-10 may be implemented in the form of executable instructions stored on a machine readable medium and executed by a processing resource (e.g., a microcontroller, a microprocessor, central processing unit core(s), an application-specific integrated circuit (ASIC), a field programmable gate array (FPGA), and the like) and/or in the form of other types of electronic circuitry. For example, the processing may be performed by one or more virtual or physical computer systems of various forms, such as the computer system described with reference to FIG. 11 below.

Reducing Provisioned Storage Capacity

Figure 6:
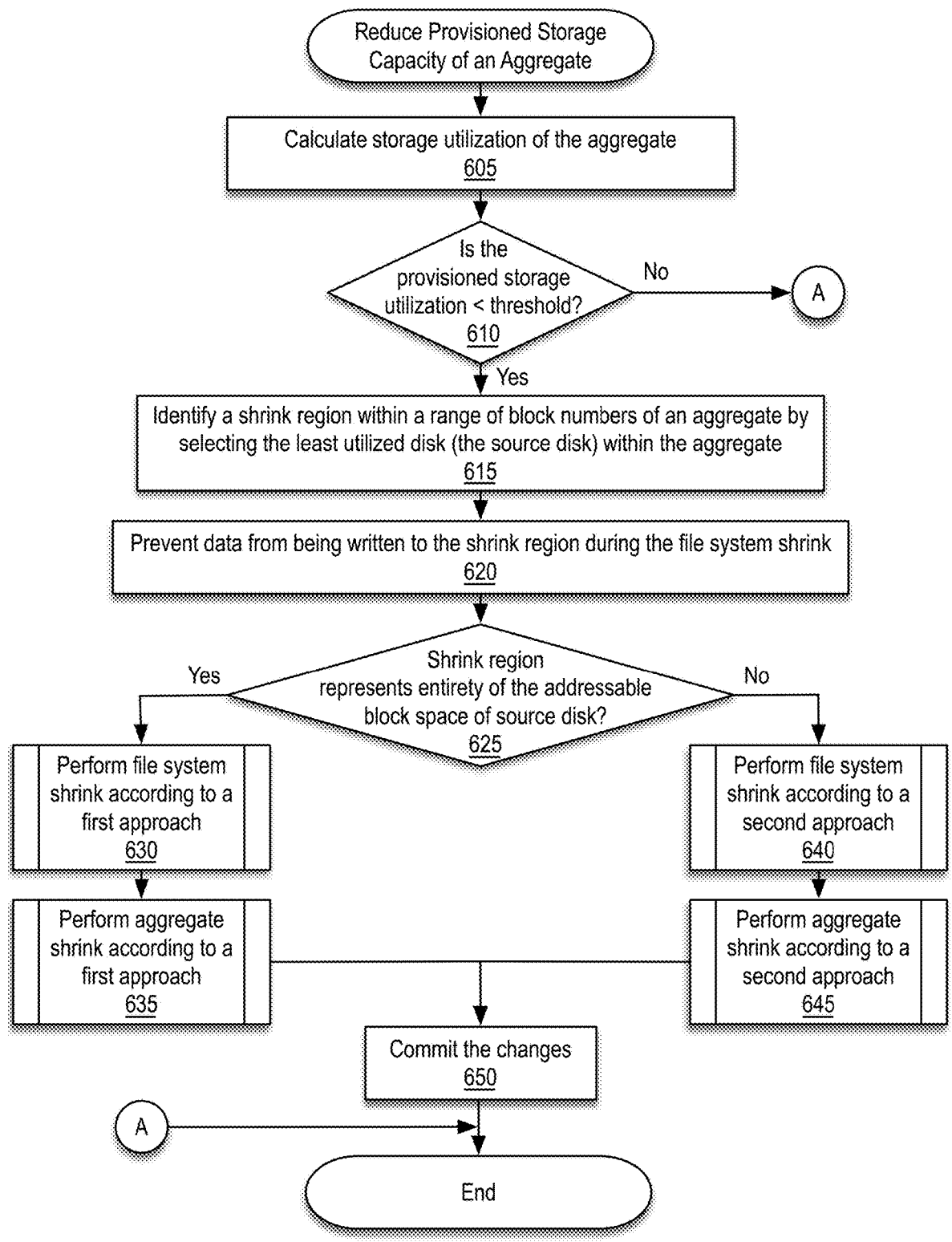
FIG. 6 is a flow diagram illustrating a set of operations for reducing the provisioned storage capacity of a disk or aggregate of disks in accordance with an embodiment of the present disclosure.

FIG. 6 is a flow diagram illustrating a set of operations for reducing the provisioned storage capacity of a disk or aggregate of disks (e.g., file system aggregate 230) in accordance with an embodiment of the present disclosure. In one embodiment, the processing described with reference to FIG. 6 may be performed by a storage appliance (e.g., virtual storage system 110) in response to a trigger event. Depending upon the particular implementation, this processing may be performed by a process associated with the file system (e.g., file system layer 111) or by an external process. The processing described with reference to FIG. 6 may be done as part of every file system operation that releases blocks, or this could be done at a fixed time interval (e.g., every N seconds), or this could be done during certain file-system events (e.g., during a CP of a write-anywhere file system, such as the proprietary Write Anywhere File Layout copy-on-write file system from NetApp, Inc. of San Jose, CA).

At block 605, the storage appliance determines a measure of storage usage. According to one embodiment, the storage appliance may calculate the storage utilization by the aggregate by dividing the number of used blocks by the total amount of provisioned storage for the aggregate.

At decision block 610, it is determined whether the provisioned storage utilization is less than a threshold (e.g., between approximately 70% to 65%). If so, processing continues with block 615; otherwise this round of processing is complete.

At block 615, a shrink region (e.g., shrink region 423 or 424) within a range of block numbers (e.g., sparse block number space 240) of an aggregate (e.g., file system aggregate 230) is identified. In one embodiment, the shrink region is identified at least in part by selecting the least utilized disk (the source disk) among the disks within the aggregate. Assuming storage utilization is somewhat consistent for various regions of the selected disk, the selection of the disk having the lowest storage utilization will result in less movement of data out of the shrink region. In alternative embodiments, any disk within the aggregate may be selected as the source disk.

As noted above, there are a number of options for identifying the shrink region, including its size (the amount by which the provisioned storage capacity is to be reduced) and starting point within the selected disk. For example, the size of the shrink region may take into account various thresholds (e.g., respective aggregate storage utilization thresholds for triggering increasing and/or reducing provisioned physical storage capacity and/or desired provisioned storage capacity growth and/or shrinkage thresholds). The size of the shrink region may be determined based on heuristics, and/or data regarding the storage space utilization of the aggregate over time. For example, if the provisioned storage capacity of the aggregate is 5 TB and historical data indicates about 2.5 TB to 3 TB of the provisioned storage capacity has been used for some period of time, then the storage appliance may suggest the provisioned storage capacity of the aggregate be reduced by 1 TB to 4 TB from 5 TB. As will be appreciated by those skilled in the art, the determination regarding the amount by which the aggregate is to be shrunk should implement hysteresis and consider the storage utilization threshold below which a disk grow may be triggered to avoid the potential for unwanted frequent switching back and forth between shrinking and growing the aggregate. Other factors that may be considered include the effort (e.g., CPU and/or disk usage) on the part of the storage system to perform the aggregate shrink. In one embodiment, the goal is to reduce the total provisioned storage capacity by a predetermined or configurable amount (e.g., about 5% to 10%).

With respect to the starting point of the shrink region, options include reducing the range of PVBNs starting at the end of the aggregate address space (e.g., the end of the last disk of the aggregate), reducing the range of PVNBs starting at the beginning of the aggregate address space (e.g., the beginning of the first disk of the aggregate), or reducing the range of PVBNs from a disk other than the first or last disk of the aggregate. In one embodiment, the shrink region may start from the end of the selected disk to be consistent with the manner in which disks are grown in the Disk Grow Patent Application.

At block 620, the storage system prevents data from being written to the shrink region during the file system shrink. In one embodiment, a shrink module (e.g., shrink module 560) communicates the fact that a reduction in the addressable PVBN space of a disk is underway to a block allocator (e.g., block allocator 550) by setting a new maximum DBN field in the data structure maintained for the file system disk within a RAID topology data store (RAID topology data store 552) that is consulted by the block allocator during allocation of new blocks. In this manner, data persisted to disk as a result of write requests (e.g., write request 506) processed during the file system shrink will make use of blocks outside of the shrink region.

At decision block 625, it is determined whether the shrink region represents the entirety of the addressable block space of the source disk. If so, processing continues with block 630; otherwise processing branches to block 640 (assuming the environment in which the storage appliance supports a smaller disk than the source disk that can accommodate the amount of valid data currently stored within the shrink region of the source disk).

At block 630, the storage appliance performs a file system shrink according to a first approach. The first approach for performing a file system shrink (when the shrink region represents the entirety of the source disk) may involve relocating data from the shrink region associated with the source disk within the aggregate to one or more other disks within the aggregate as described further below with reference to FIG. 7.

At block 635, after completion of the file system shrink, the storage appliance performs an aggregate shrink according to a first approach. The first approach for performing aggregate shrink (when the shrink region represents the entirety of the source disk) may involve removal of the source disk (e.g., hyperscale disk 425a from which valid data was relocated during block 630 elsewhere within the aggregate) from the aggregate as described further below with reference to FIG. 8.

At block 650, changes relating to the aggregate shrink are committed. According to one embodiment, one or more data structures utilized by various layers (e.g., file system layer 111, RAID layer 113, and storage layer 115) are updated to reflect the reduced provisioned storage capacity of the aggregate. For example, after aggregate shrink has been completed, the maximum usable DBN may be set to the new maximum DBN and the new maximum DBN field may be cleared within the data structure for the selected disk within a RAID topology data store (e.g., RAID topology data store 552).

Depending on the starting point of the shrink region, file system information changes may vary. For example, if the first disk of the aggregate is selected, file system information regarding the total number of blocks available for use by the file system should ultimately be reduced as well as file system information regarding the first VBN. Similarly, if the last disk is selected, the file system information regarding the total number of blocks available should be reduced as well as file system information regarding the last VBN. Additionally, the size of any bitmap files (e.g., tracking used/unused blocks) may also be reduced. If the selected disk is other than the first or the last disk of the aggregate, reduction of the PVBN space for the aggregate may be accomplished by incorporating the range of PVBNs addressed by the disk within the logical size that is not backed by physical blocks (e.g., as shown by FIG. 2). In this case, the file system information regarding the total number of blocks available for use by the file system will be reduced, but the file system information regarding the last VBN remains unchanged as well as the bitmap files.

At block 640, the storage appliance performs a file system shrink according to a second approach. The second approach for performing a file system shrink (when the shrink region represents less than the entirety of the source disk) may involve relocating data from the shrink region associated with the selected disk (e.g., hyperscale disk 425f) within the aggregate to one or more regions outside of the shrink region as in block 630 and then moving valid data outside of the shrink region of the selected disk to a new, smaller disk (e.g., smaller hyperscale disk 425g) added to the aggregate as described further below with reference to FIG. 9.

At block 645, after completion of the file system shrink, the storage appliance performs an aggregate shrink according to a second approach. The second approach for performing aggregate shrink (when the shrink region represents less than the entirety of the source disk) may involve removal of the source disk (e.g., hyperscale disk 425f) from which valid data was relocated, for example, via a combination of block reallocator functionality and data mirroring during block 640, as described further below with reference to FIG. 10.

While in the context of the present example, two different file system shrink and aggregate shrink approaches are assumed to be implemented and selectively performed based on the nature of the shrink region, in alternative embodiments, the storage appliance may instead implement one approach or the other.

In yet another alternative embodiment, if the environment (e.g., hyperscaler 120) in which the storage appliance is operating supports shrinking of an existing disk, such disk shrink functionality may be used (following performance of the first approach for file system shrink) to shrink one or more disks within the aggregate rather than removing a disk from the aggregate.

First Approach for File System Shrink

Figure 7:
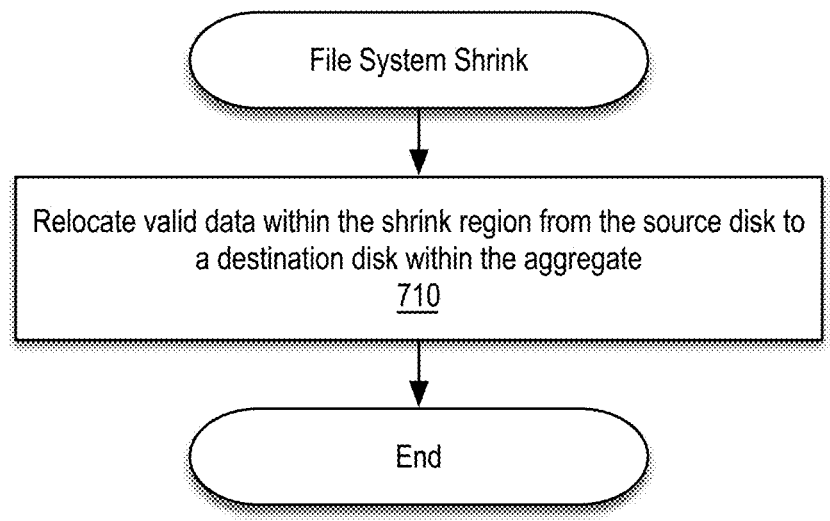
FIG. 7 is a flow diagram illustrating a set of operations for shrinking a file system by relocating valid data within a shrink region of a source disk to one or more destination disks within the aggregate in accordance with an embodiment of the present disclosure.

FIG. 7 is a flow diagram illustrating a set of operations for shrinking a file system by relocating valid data within a shrink region of a source disk to one or more destination disks within the aggregate (e.g., file system aggregate 230) in accordance with an embodiment of the present disclosure. The processing described with reference to FIG. 7 represents a non-limiting example of operations that may be performed in block 630 of FIG. 6 in which the shrink region (e.g., shrink region 423) represents the entirety of the addressable block space of the source disk.

At block 710, valid data within the shrink region is relocated from the source disk to another disk (the destination disk) within the aggregate. According to one embodiment, the relocation of valid data is performed by a block reallocator (e.g., block reallocator 570). For example, for each block within the shrink region the block reallocator may read valid data, if any, from the block, find and allocate an unused block within the aggregate, and write the valid data to the newly allocated block.

As those skilled in the art will appreciate, there may be specific issues and special block movement scenarios to take into consideration during performance of file system shrink. For example, to the extent the file system may have reserved one or more pools of free PVBNs, a cleanup of such pools of PVBNs that have yet to be used should be performed.

First Approach for Aggregate Shrink

Figure 8:
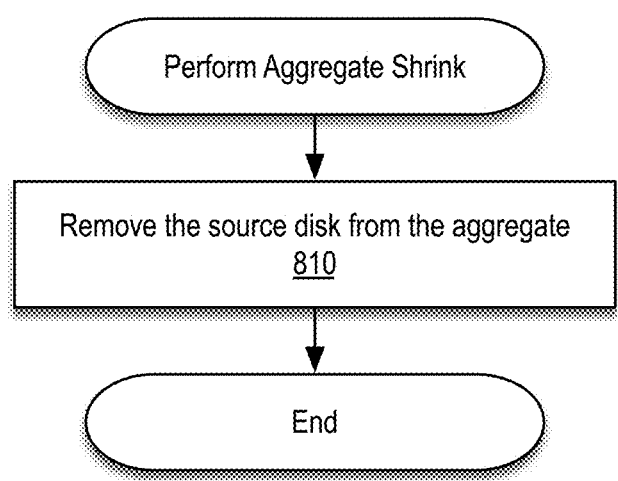
FIG. 8 is a flow diagram illustrating a set of operations for shrinking an aggregate following a file system shrink of FIG. 7 in accordance with an embodiment of the present disclosure.

FIG. 8 is a flow diagram illustrating a set of operations for shrinking an aggregate (e.g., file system aggregate 230) following a file system shrink of FIG. 7 in accordance with an embodiment of the present disclosure. The processing described with reference to FIG. 8 represents a non-limiting example of operations that may be performed in block 635 of FIG. 6 in which the shrink region (e.g., shrink region 423) represents the entirety of the addressable block space of the source disk.

At block 810, the source disk, from which valid data was previously relocated elsewhere within the aggregate, is removed from the aggregate.

Second Approach for File System Shrink

Figure 9:
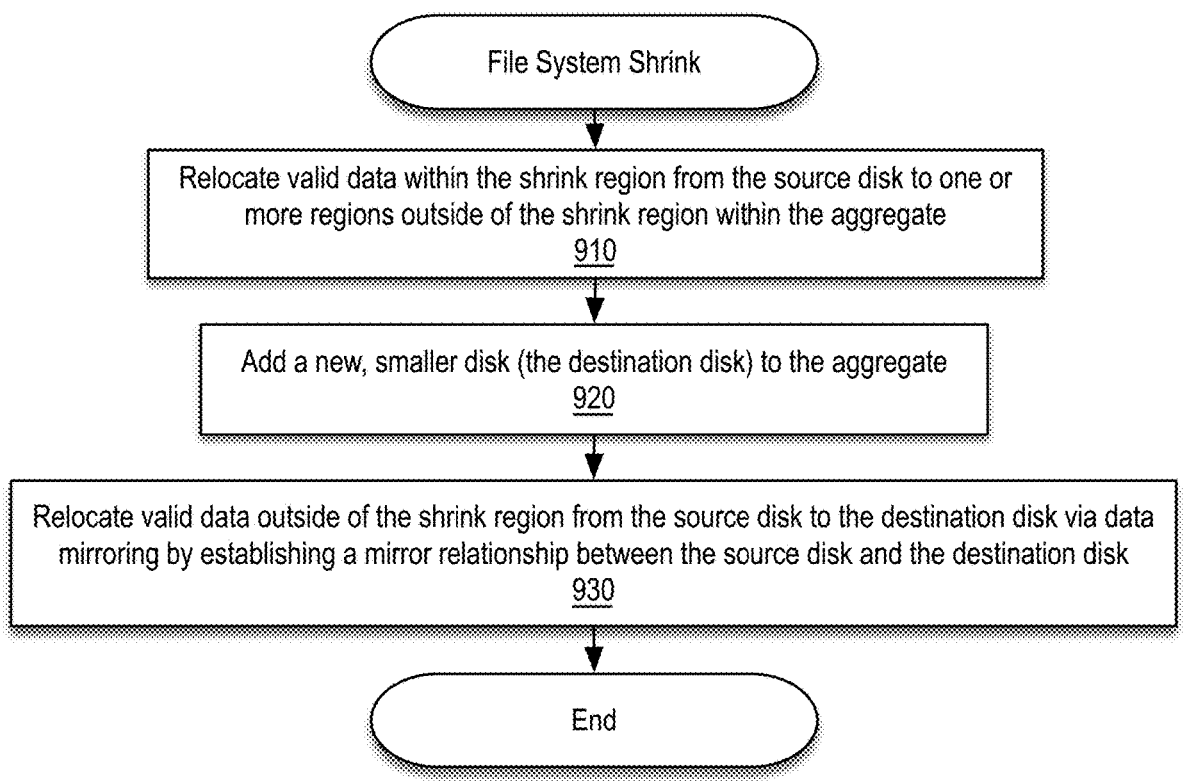
FIG. 9 is a flow diagram illustrating a set of operations for shrinking a file system by relocating valid data within a shrink region of a source disk of an aggregate to one or more other regions within the aggregate and mirroring valid data from outside the shrink region of the source disk to a new, smaller size disk added to the aggregate in accordance with an embodiment of the present disclosure.

FIG. 9 is a flow diagram illustrating a set of operations for shrinking a file system by relocating valid data within a shrink region (e.g., shrink region 424) of a source disk (e.g., hyperscale disk 425f) of an aggregate (e.g., file system aggregate 230) to one or more other regions within the aggregate and mirroring valid data from outside the shrink region of the source disk to a new, smaller size disk added to the aggregate in accordance with an embodiment of the present disclosure. The processing described with reference to FIG. 9 represents a non-limiting example of operations that may be performed in block 640 of FIG. 6. In the context of the present example, it is assumed the environment in which the storage appliance operates supports a smaller-sized disk than the source disk that is sufficient to accommodate the amount of valid data stored on the source disk both within and outside of the shrink region.

At block 910, valid data within the shrink region is relocated from the source disk to one or more regions outside of the shrink region within the aggregate. According to one embodiment, the relocation of valid data is performed by a block reallocator (e.g., block reallocator 570). For example, for each block within the shrink region the block reallocator may read valid data, if any, from the block, find and allocate an unused block within the aggregate, and write the valid data to the newly allocated block.

At block 920, the new, smaller disk (the destination disk) is added to the aggregate.

At block 930, valid data of the source disk outside of the shrink region is relocated from the source disk to the destination disk. In one embodiment, data mirroring may be used to perform real-time replication of valid data from outside of the shrink region of the source disk to the destination disk. For example, a mirror relationship may be established between the source disk and the destination disk to bring the mirrors (i.e., the source and destination disks) into sync using data mirroring technology. In one embodiment, the data mirroring technology (e.g., RAID SyncMirror) may provide for real-time, synchronous mirroring of data, implemented at the RAID level.

Second Approach for Aggregate Shrink

Figure 10:
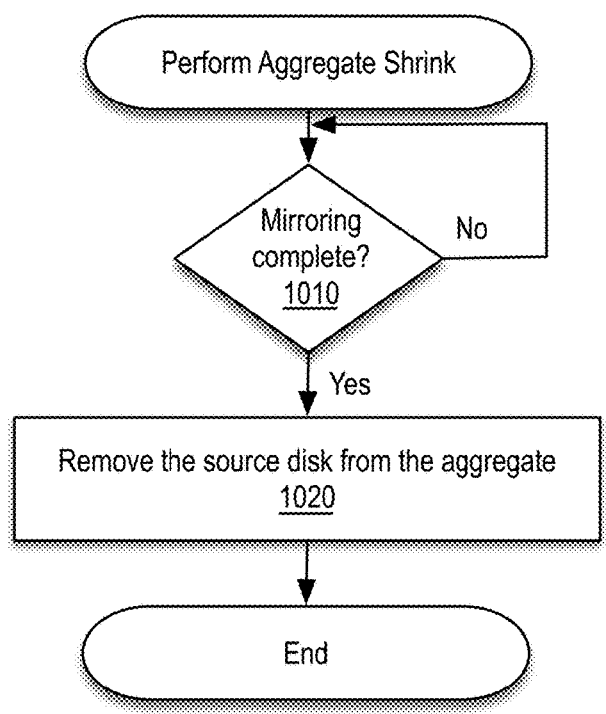
FIG. 10 is a flow diagram illustrating a set of operations for shrinking an aggregate following a file system shrink of FIG. 9 in accordance with an embodiment of the present disclosure.

FIG. 10 is a flow diagram illustrating a set of operations for shrinking an aggregate following a file system shrink of FIG. 9 in accordance with an embodiment of the present disclosure. The processing described with reference to FIG. 10 represents a non-limiting example of operations that may be performed in block 645 of FIG. 6.

At decision block 1010, it is determined whether the data mirroring (e.g., initiated at block 920) is complete. If so, processing continues with block 1020; otherwise, processing loops back to decision block 1010.

At block 1020, the source disk is removed from the aggregate, for example, after the mirror relationship between the source disk and the destination disk is disestablished.

While in the context of the examples described with reference to the flow diagrams of FIGS. 7-10, a number of enumerated blocks are included, it is to be understood that examples may include additional blocks before, after, and/or in between the enumerated blocks. Similarly, in some examples, one or more of the enumerated blocks may be omitted and/or performed in a different order.

Example Computer System

Embodiments of the present disclosure include various steps, which have been described above. The steps may be performed by hardware components or may be embodied in machine-executable instructions, which may be used to cause a processing resource (e.g., a general-purpose or special-purpose processor) programmed with the instructions to perform the steps. Alternatively, depending upon the particular implementation, various steps may be performed by a combination of hardware, software, firmware and/or by human operators.

Embodiments of the present disclosure may be provided as a computer program product, which may include a non-transitory machine-readable storage medium embodying thereon instructions, which may be used to program a computer (or other electronic devices) to perform a process. The machine-readable medium may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware).

Various methods described herein may be practiced by combining one or more non-transitory machine-readable storage media containing the code according to embodiments of the present disclosure with appropriate special purpose or standard computer hardware to execute the code contained therein. An apparatus for practicing various embodiments of the present disclosure may involve one or more computers (e.g., physical and/or virtual servers) (or one or more processors within a single computer) and storage systems containing or having network access to computer program(s) coded in accordance with various methods described herein, and the method steps associated with embodiments of the present disclosure may be accomplished by modules, routines, subroutines, or subparts of a computer program product.

Figure 11:
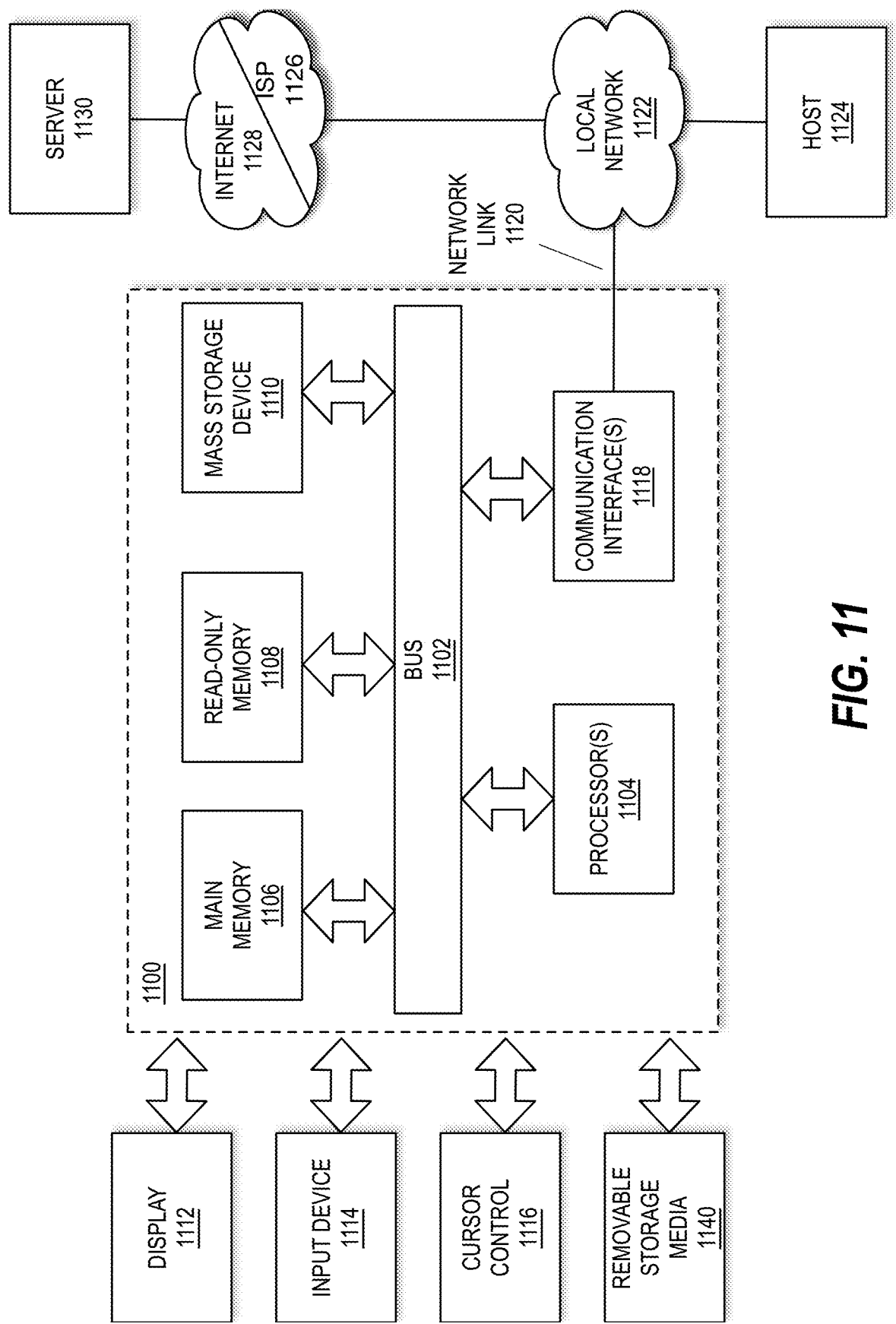
FIG. 11 illustrates an example computer system in which or with which embodiments of the present disclosure may be utilized.

FIG. 11 is a block diagram that illustrates a computer system 1100 in which or with which an embodiment of the present disclosure may be implemented. Computer system 1100 may be representative of all or a portion of the computing resources associated with a storage appliance (e.g., virtual storage system 110). Notably, components of computer system 1100 described herein are meant only to exemplify various possibilities. In no way should example computer system 1100 limit the scope of the present disclosure. In the context of the present example, computer system 1100 includes a bus 1102 or other communication mechanism for communicating information, and a processing resource (e.g., a hardware processor 1104) coupled with bus 1102 for processing information. Hardware processor 1104 may be, for example, a general purpose microprocessor.

Computer system 1100 also includes a main memory 1106, such as a random access memory (RAM) or other dynamic storage device, coupled to bus 1102 for storing information and instructions to be executed by processor 1104. Main memory 1106 also may be used for storing temporary variables or other intermediate information during execution of instructions to be executed by processor 1104. Such instructions, when stored in non-transitory storage media accessible to processor 1104, render computer system 1100 into a special-purpose machine that is customized to perform the operations specified in the instructions.

Computer system 1100 further includes a read only memory (ROM) 1108 or other static storage device coupled to bus 1102 for storing static information and instructions for processor 1104. A storage device 1110, e.g., a magnetic disk, optical disk or flash disk (made of flash memory chips), is provided and coupled to bus 1102 for storing information and instructions.

Computer system 1100 may be coupled via bus 1102 to a display 1112, e.g., a cathode ray tube (CRT), Liquid Crystal Display (LCD), Organic Light-Emitting Diode Display (OLED), Digital Light Processing Display (DLP) or the like, for displaying information to a computer user. An input device 1114, including alphanumeric and other keys, is coupled to bus 1102 for communicating information and command selections to processor 1104. Another type of user input device is cursor control 1116, such as a mouse, a trackball, a trackpad, or cursor direction keys for communicating direction information and command selections to processor 1104 and for controlling cursor movement on display 1112. This input device typically has two degrees of freedom in two axes, a first axis (e.g., x) and a second axis (e.g., y), that allows the device to specify positions in a plane.

Removable storage media 1140 can be any kind of external storage media, including, but not limited to, hard-drives, floppy drives, IOMEGA® Zip Drives, Compact Disc-Read Only Memory (CD-ROM), Compact Disc-Re-Writable (CD-RW), Digital Video Disk-Read Only Memory (DVD-ROM), USB flash drives and the like.

Computer system 1100 may implement the techniques described herein using customized hard-wired logic, one or more ASICs or FPGAs, firmware or program logic which in combination with the computer system causes or programs computer system 1100 to be a special-purpose machine. According to one embodiment, the techniques herein are performed by computer system 1100 in response to processor 1104 executing one or more sequences of one or more instructions contained in main memory 1106. Such instructions may be read into main memory 1106 from another storage medium, such as storage device 1110. Execution of the sequences of instructions contained in main memory 1106 causes processor 1104 to perform the process steps described herein. In alternative embodiments, hard-wired circuitry may be used in place of or in combination with software instructions.

The term "storage media" as used herein refers to any non-transitory media that store data or instructions that cause a machine to operation in a specific fashion. Such storage media may comprise non-volatile media or volatile media. Non-volatile media includes, for example, optical, magnetic or flash disks, such as storage device 1110. Volatile media includes dynamic memory, such as main memory 1106. Common forms of storage media include, for example, a flexible disk, a hard disk, a solid state drive, a magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1102. Transmission media can also take the form of acoustic or light waves, such as those generated during radio-wave and infra-red data communications.

Various forms of media may be involved in carrying one or more sequences of one or more instructions to processor 1104 for execution. For example, the instructions may initially be carried on a magnetic disk or solid state drive of a remote computer. The remote computer can load the instructions into its dynamic memory and send the instructions over a telephone line using a modem. A modem local to computer system 1100 can receive the data on the telephone line and use an infra-red transmitter to convert the data to an infra-red signal. An infra-red detector can receive the data carried in the infra-red signal and appropriate circuitry can place the data on bus 1102. Bus 1102 carries the data to main memory 1106, from which processor 1104 retrieves and executes the instructions. The instructions received by main memory 1106 may optionally be stored on storage device 1110 either before or after execution by processor 1104.

Computer system 1100 also includes a communication interface 1118 coupled to bus 1102. Communication interface 1118 provides a two-way data communication coupling to a network link 1120 that is connected to a local network 1122. For example, communication interface 1118 may be an integrated services digital network (ISDN) card, cable modem, satellite modem, or a modem to provide a data communication connection to a corresponding type of telephone line. As another example, communication interface 1118 may be a local area network (LAN) card to provide a data communication connection to a compatible LAN. Wireless links may also be implemented. In any such implementation, communication interface 1118 sends and receives electrical, electromagnetic or optical signals that carry digital data streams representing various types of information.

Network link 1120 typically provides data communication through one or more networks to other data devices. For example, network link 1120 may provide a connection through local network 1122 to a host computer 1124 or to data equipment operated by an Internet Service Provider (ISP) 1126. ISP 1126 in turn provides data communication services through the worldwide packet data communication network now commonly referred to as the "Internet" 1128. Local network 1122 and Internet 1128 both use electrical, electromagnetic or optical signals that carry digital data streams. The signals through the various networks and the signals on network link 1120 and through communication interface 1118, which carry the digital data to and from computer system 1100, are example forms of transmission media.

Computer system 1100 can send messages and receive data, including program code, through the network(s), network link 1120 and communication interface 1118. In the Internet example, a server 1130 might transmit a requested code for an application program through Internet 1128, ISP 1126, local network 1122 and communication interface 1118. The received code may be executed by processor 1104 as it is received, or stored in storage device 1110, or other non-volatile storage for later execution.

All examples and illustrative references are non-limiting and should not be used to limit the applicability of the proposed approach to specific implementations and examples described herein and their equivalents. For simplicity, reference numbers may be repeated between various examples. This repetition is for clarity only and does not dictate a relationship between the respective examples. Finally, in view of this disclosure, particular features described in relation to one aspect or example may be applied to other disclosed aspects or examples of the disclosure, even though not specifically shown in the drawings or described in the text.

The foregoing outlines features of several examples so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the examples introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method of reducing a provisioned storage capacity of an aggregate of a storage appliance, the method comprising, while the storage appliance is online and continues to serve one or more clients:

identifying, by the storage appliance, a shrink region within a range of block numbers of the aggregate by selecting a source disk of a plurality of disks within the aggregate;

relocating, by the storage appliance, valid data within the shrink region from the source disk to a destination disk of the plurality of disks within the aggregate;

reducing, by the storage appliance, the provisioned storage capacity of the aggregate by removing the source disk from the aggregate based on the shrink region representing an entirety of an addressable block space of the source disk; and updating, by the storage appliance, one or more data structures utilized by a file system of the storage appliance to reflect the reduced provisioned storage capacity of the aggregate.

2. The method of claim 1, wherein selection of the source disk comprises:

determining a storage utilization of candidate source disks of the plurality of disks; and selecting a disk of the candidate source disks having a lowest storage utilization as the source disk.

3. The method of claim 1, further comprising prior to identification of the shrink region, determining existence of a trigger condition.

4. The method of claim 3, wherein the trigger condition comprises a storage utilization of the aggregate falling below a threshold.

5. The method of claim 1, wherein the range of block numbers represents a sparse physical volume block number (PVBN) space.

6. The method of claim 1, wherein the storage appliance comprises a virtual storage appliance hosted by a hyperscaler.

7. A non-transitory machine readable medium storing instructions, which when executed by a processing resource of a storage appliance, cause the storage appliance to, while the storage appliance is online and continues to serve one or more clients:

identify a shrink region within a range of block numbers of an aggregate of the storage appliance by selecting a source disk of a plurality of disks within the aggregate;

relocate valid data within the shrink region from the source disk to a destination disk of the plurality of disks within the aggregate;

reduce a provisioned storage capacity of the aggregate by removing the source disk from the aggregate based on the shrink region representing an entirety of an addressable block space of the source disk; and update one or more data structures utilized by a file system of the storage appliance to reflect the reduced provisioned storage capacity of the aggregate.

8. The non-transitory machine readable medium of claim 7, wherein the source disk is selected by:

determining a storage utilization of candidate source disks of the plurality of disks; and selecting a disk of the candidate source disks having a lowest storage utilization as the source disk.

9. The non-transitory machine readable medium of claim 7, wherein prior to identification of the shrink region, the storage appliance determines existence of a trigger condition.

10. The non-transitory machine readable medium of claim 9, wherein the trigger condition comprises a storage utilization of the aggregate falling below a threshold.

11. The non-transitory machine readable medium of claim 7, wherein the range of block numbers represents a sparse physical volume block number (PVBN) space.

12. The non-transitory machine readable medium of claim 7, wherein the storage appliance comprises a virtual storage appliance hosted by a hyperscaler.

13. A storage appliance comprising:
one or more processing resources; and
instructions that when executed by the one or more processing resources cause the storage appliance to, while the storage appliance is online and continues to serve one or more clients:
identify a shrink region within a range of block numbers of an aggregate of the storage appliance by selecting a source disk of a plurality of disks within the aggregate;
relocate valid data within the shrink region from the source disk to a destination disk of the plurality of disks within the aggregate;
reduce a provisioned storage capacity of the aggregate by removing the source disk from the aggregate based on the shrink region representing an entirety of an addressable block space of the source disk; and
update one or more data structures utilized by a file system of the storage appliance to reflect the reduced provisioned storage capacity of the aggregate.

14. The storage appliance of claim 13, wherein the source disk is selected by:
determining a storage utilization of candidate source disks of the plurality of disks; and
selecting a disk of the candidate source disks having a lowest storage utilization as the source disk.

15. The storage appliance of claim 13, wherein prior to identification of the shrink region, the storage appliance determines existence of a trigger condition.

16. The storage appliance of claim 15, wherein the trigger condition comprises a storage utilization of the aggregate falling below a threshold.

17. The storage appliance of claim 13, wherein the range of block numbers represents a sparse physical volume block number (PVBN) space.

18. The method of claim 1, wherein the plurality of disks comprise Logical Unit Numbers (LUNs).

19. The non-transitory machine readable medium of claim 7, wherein the plurality of disks comprise Logical Unit Numbers (LUNs).

20. The storage appliance of claim 13, wherein the plurality of disks comprise Logical Unit Numbers (LUNs).

* * * * *